United States Patent [19]

Cook et al.

[11] Patent Number: 4,799,647
[45] Date of Patent: Jan. 24, 1989

[54] VALVE ASSEMBLY FOR CONTROLLING FLUID FLOW

[75] Inventors: Timothy Cook, Oakwood; Joseph G. Craigen, Denton Burn; Clive A. Morgan, Orchard End, all of England

[73] Assignee: British Gas Corporation, England

[21] Appl. No.: 402,036

[22] Filed: Jul. 26, 1982

[30] Foreign Application Priority Data

Aug. 27, 1981 [GB] United Kingdom ............ 8126096

[51] Int. Cl.[4] .............................................. F16K 31/12
[52] U.S. Cl. ................................... 251/356; 251/358; 137/219
[58] Field of Search ............... 251/356, 358, 61.1, 251/63.5, 62, 63; 137/219; 138/46

[56] References Cited

U.S. PATENT DOCUMENTS

| | | | |
|---|---|---|---|
| 2,917,269 | 12/1959 | Welker | 251/63.5 |
| 2,992,808 | 7/1961 | Burritt, Jr. et al. | 251/356 |
| 3,746,300 | 7/1973 | Welker | 251/63.5 |
| 3,836,113 | 9/1974 | Johnson | 251/61.7 |
| 4,137,933 | 2/1979 | Culpepper | 137/219 |
| 4,206,902 | 6/1980 | Barthel et al. | 251/63.5 |
| 4,351,510 | 9/1982 | Welker | 251/63.5 |
| 4,354,661 | 10/1982 | Welker | 251/63.5 |

FOREIGN PATENT DOCUMENTS

| | | | |
|---|---|---|---|
| 7509788 | 11/1975 | Netherlands | 251/63.5 |
| 2002090 | 2/1979 | United Kingdom | 251/358 |

Primary Examiner—A. Michael Chambers
Attorney, Agent, or Firm—Larson and Taylor

[57] ABSTRACT

The present invention relates to a valve assembly for controlling fluid flow in a fluid flow regulator. The valve assembly comprises a deformable plug 1 e.g. of rubber, having a cylindrical body formed with a circumferential groove 5 and a pair of backing plates 2 and 3 located at either end of the plug 1. The plates 2 and 3 are bonded to the plug 1 and, in use, plate 2 is moved to stress the plug 1 and cause it to expand radially to restrict an annular clearance between the plug 1 and a valve seat (not shown) in which the plug 1 is located. This enables fluid flow through the clearance to be controlled. A flanged steel ring 4 is mounted on the backing plate 2 and a circular neck portion 10 of the plug 1 is located between the ring 4 and the plate 2, the portion being bonded to the plate 2. The ring 4, and especially the groove 5, serve to prevent or inhibit erosion of the plug surface in use.

12 Claims, 2 Drawing Sheets

VALVE ASSEMBLY FOR CONTROLLING FLUID FLOW

FIELD OF THE INVENTION

The present invention relates to a valve assembly for controlling fluid flow, particualarly gas flow, in a fluid flow regulator of the type providing a controlled variation in volume of flow through the fluid transmission pipe line.

BACKGROUND OF THE INVENTION

Valve assemblies for the purpose described above usually comprise a deformable plug having a cylindrical body which is situated in a housing providing a passageway for fluid. The plug is seated within a valve seat in the housing between two backing plates forming part of the assembly. The plug outer diameter is such that when unstressed there is provided between the plug and the valve seat an annular clearance for the flow of fluid. In use one backing plate is fixed to the housing and other plate can be moved towards the fixed plate by some form of axial stressing means, such as a movable cylinder, so that the plug is stressed between the plates and radially expands to restrict the annular clearance and thereby fluid flow.

The cylinder is hydraulically linked to a diaphragm motor assembly which serves to provide fine adjustment of the pressure of the hydraulic fluid and thereby of the cylinder movement. A typical conventional valve assembly and fluid flow regulator is described in some detail in UK patent specification No. 1035427.

One problem with conventional valve assemblies is that during use the deformable plug is subject to severe erosion. Consequently the plugs must be replaced at relatively frequent intervals and as these plugs are relatively expensive this is a considerable drain on operating costs.

SUMMARY OF THE INVENTION

Accordingly it is an object of the present invention to provide a valve assembly in which the useful life of the plug is significantly extended.

According therefore to the present invention there is provided a valve assembly for controlling fluid flow in a fluid flow regulator, the assembly including a deformable plug having a cylindrical body which is circumferentially grooved.

Preferably the plug is formed with a wear resistant surface extending inwardly from one end.

Suitably the surface is formed by a ring of a wear resistant material secured to the plug body.

Conveniently the ring is of metal.

Preferably the plug is provided at each end with a backing plate.

Suitably one end of the plug is provided with a projecting circular neck portion which is located between the ring and the corresponding backing plate.

Conveniently the plug has only one circumferential groove which is located closer to one end of the plug than to the other.

Preferably the plug has only one circumferential groove which is located closer to that end adjacent the wear resistant surface than to the other end.

Suitably the plug ends and the backing plates have surfaces conforming to each other.

Conveniently one of the plug end surfaces forms a recess to retain an insert portion on one of the backing plates.

Preferably the recess is located at one end of the plug and the wear resistant surface is at the opposite end of the plug.

BRIEF DESCRIPTION OF THE DRAWINGS

An embodiment of the invention will now be particularly described with reference to the accompanying drawings in which.

DETAILED DESCRIPTION OF THE PREFERRED EMBODIMENT

Figure 1:
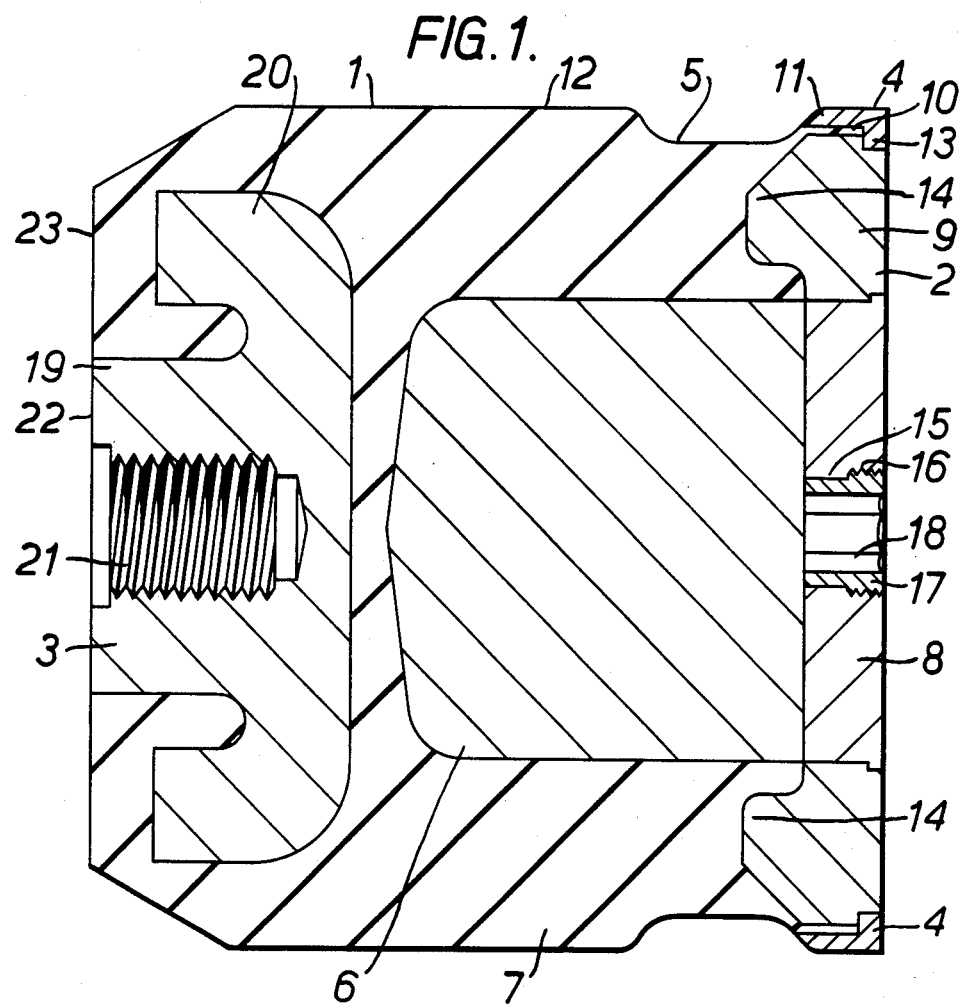
FIG. 1 is a side view in section of the valve asembly.

Referring to drawings, the valve assembly shown in FIG. 1 comprises a plug 1 of a deformable yet resilient material such as rubber, a pair of steel backing plates 2 and 3 located at either end of the plug 1 and a flanged steel ring 4 disposed at the same end of the plug 1 as the backing plate 2.

The plug 1 has a cylindrical body which is provided with a circumferential groove 5 adjacent to the ring 4. The groove 5 extends for approximately one fifth of the plug length and to a depth of about one tenth of the plug radius.

The plug 1 comprises two portions, an inner core 6 and an outer sleeve 7 enclosing the core 6. The inner core 6 is of a rubber which is softer and more resilient than the outer sleeve 7 to enable the plug to deform radially outwardly more easily.

The backing plate 2 is also formed in two portions, a central disc 8 seated within an outer annulus 9. The disc 8 is secured by fixing screws (not shown) to the annulus 9.

The plug sleeve 7 has a circular neck portion 10 formed at one end and this is located between the ring 4 and the backing plate 2, the ring being a push fit onto the neck 10.

The ring 4 itself has an axial portion 11 whose outer surface is substantially parallel to the outer axial surface 12 of the plug sleeve 7, and an annular end portion 13 engaged in a recess in the annular portion 9 of the backing plate 2. This annular portion 9 has an inwardly directed circular rib 14 which is located within a corresponding circular recess in the adjacent end of the plug body and is bonded to the plug 1. The plate disc 8 has a circular central bore 15 formed with splines 16 extending partially inwardly from the outer face of the plate 2. A circular bush 17 having a partially externally splined surface corresponding to the splines 16 is located and held within the bore 15. The bush 17 has a hexagonal internal bore 18 for engaging a cylindrical spigot extending from an actuating cylinder shown in FIG. 2 as will be subsequently described.

The plug 1 is formed at its other end with a seat or recess to receive the backing plate 3. The backing plate 3 has a cylindrical neck portion 19 extending through a corresponding bore in the end of the plug and terminating in a cap 20 located in a corresponding recess in the plug sleeve 7 and bonded thereto so as to hold the plate 3 securely in engagement with the plug 1. The cylindrical portion 19 of the plate 3 is formed with a threaded internal bore 21 to receive a mounting screw as will be subsequently described. The outer face 22 of the backing plate 3 terminates flush with the outer surface 23 of the plug end adjacent the plate 3. The plates 2 and 3 and the ring 4 can be formed in situ with the plug 1 when moulded.

Figure 2:
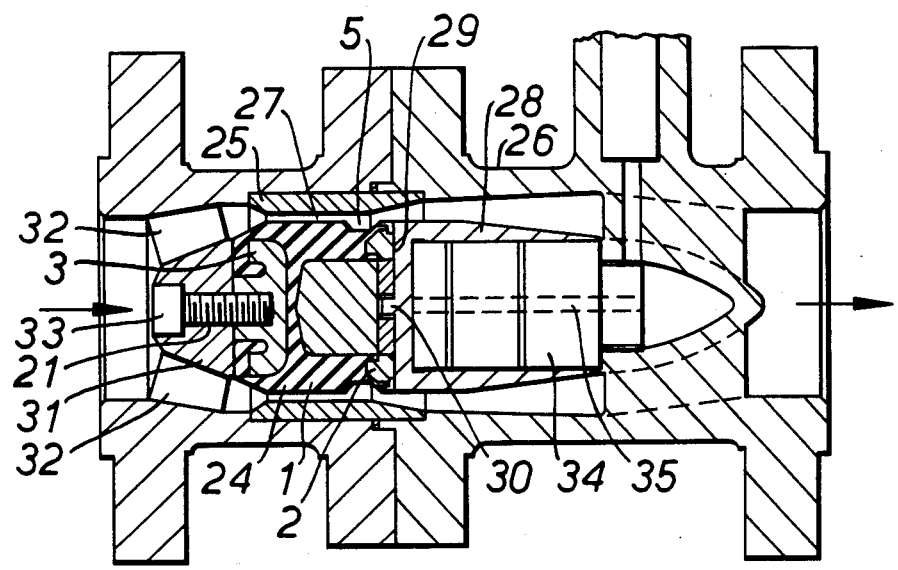
FIG. 2 is a side view partly in section of the valve assembly shown in FIG. 1 mounted for operation in a conventional fluid flow regulator.

Referring to FIG. 2 the valve assembly 24 is located in a cylindrical valve seat 25 of a conventional fluid flow regulator formed in a fluid transmission pipe line 26.

The plug outer diameter is such that when unstressed there is provided between the plug and the valve seat an annular clearance 27 for the flow of fluid (flowing in the direction of the arrows.)

In use as conventional a movable cylinder 28 engages the backing plate 2 to move the plate 2 towards the backing plate 3 to stress the plug 1 and restrict the annular clearance 27. The front wall 29 of the cylinder 28 is provided with a projecting cylindrical spigot 30 which locates in the hexagonal bore 18 of the bush 17 to guide the plate 2 during its movement.

The backing plate 3 is secured to a fixed boss 31 which itself is secured by fins 32 to the internal wall of the pipe line. The boss 31 is provided with a threaded central bore corresponding to the threaded internal bore 21 of the backing plate 3 and with a counter-sunk recess so as to receive a counter-sunk mounting screw 33 to attach the backing plate 3 to the boss 31.

As conventional the cylinder 28 moves relative to a fixed internal piston 34 which is suitably secured by means (not shown) to the internal wall of the pipe line 25. The piston 34 is provided internally with a passsageway 35 terminating at one end adjacent the cylinder front wall 29 and communicating with a diaphragm motor assembly (not shown) for supplying hydraulic fluid into the passageway 35. The pressure exerted by the fluid upon the front wall 29 of the cylinder 28 causes it to move and thereby move the movable backing plate 2 towards the fixed backing plate 3. As a consequence the plug 1 is stressed between the plates 2 and 3 and radially expands to restrict the annular clearance 27 and thereby fluid flow. The pressure of the hydraulic fluid can be accurately controlled by the motor thus enabling the movement of the cylinder 28 and consequently the expansion of the plug 1 to be finely adjusted. Relaxation of the hydraulic pressure causes the plug 1 to return to its original unstressed shape thereby retracting the backing plate 2 and the cylinder 28.

The presence of the groove 5 in the plug 1 adjacent to the movable backing plate 2 surprisingly serves to significantly increase the overall lifetime of the plug 1 compared with the service life of conventional ungrooved plugs 1. This is believed to be due to the fact that the groove removes the point of maximum stress concentration within the plug and thereby prevents the extrusion of the rubber at the movable end of the plug. Consequently the erosion of the plug caused by the flow of gas during the period when the plug is stressed is eliminated.

The ring 4 forms a protective shroud for the movable end surface of the plug and prevents or inhibits the erosion which occurs with conventional plugs where the surface is in direct contact with the gas.

While a two part plug with inner core and outer sleeve has been described it will be appreciated that integral or homogeneous one part plugs can also be formed. It has been found that two part plugs are more suitable for large diameter plugs while one part plugs are more suitable for smaller diameter applications.

Similarly the plate 2 can be made in a two part section when a two part plug is being made or as an integral component when a one part plug is being made.

We claim:

1. A valve assembly for controlling fluid flow in a fluid flow regulator, the assembly including a deformable plug having a cylindrical body with a longitudinal axis which is expanded radially about the longitudinal axis of said cylindrical body to restrict an annular clearance thereabout, said cylindrical body including a circumferential groove radially directed toward the longitudinal axis of said cylindrical body.

2. An assembly as claimed in claim 1 which the plug is formed with a wear resistant surface extending inwardly from one end.

3. An assembly as claimed in claim 2 in which the surface is formed by a ring of a wear resistant material secured to the plug body.

4. An assembly as claimed in claim 3 in which the ring is of metal.

5. An assembly as claimed in claim 1 claims in which the plug is provided at each end with a backing plate.

6. An assembly as claimed in claim 5 in which one end of the plug is provided with a projecting circular neck portion which is located between the ring and the corresponding backing plate.

7. An assembly as claimed in claim 1 in which the plug has a movable end and a stationary end, and only one circumferential groove which is located closer to the movable end of the plug than to the stationary end.

8. An assembly as claimed in claim 2 in which the plug has a movable end which is adjacent the wear resistant surface and a stationary end, and only one circumferential groove which is located closer to the movable than to the stationary end.

9. An assembly as claimed in claim 5 in which the plug ends and the backing plates have surfaces conforming to each other.

10. An assembly as claimed in claim 9 in which one of the plug end surfaces forms a recess to retain an insert portion on one of the backing plates.

11. An assembly as claimed in claim 10 in which the recess is located at one end of the plug and the wear resistant surface is at the opposite end of the plug.

12. A fluid flow regulator incorporating a valve assembly for controlling the fluid flow in the fluid regulator, the valve assembly including a deformable plug having a cylindrical body with a longitudinal axis which is expanded radially about the longitudinal axis of said cylindrical body to restrict fluid flow through an annular clearance thereabout, said cylindrical body including a circumferential groove therein radially directed toward the longitudinal axis of said cylindrcal body.

* * * * *